United States Patent Office 2,913,852
Patented Nov. 24, 1959

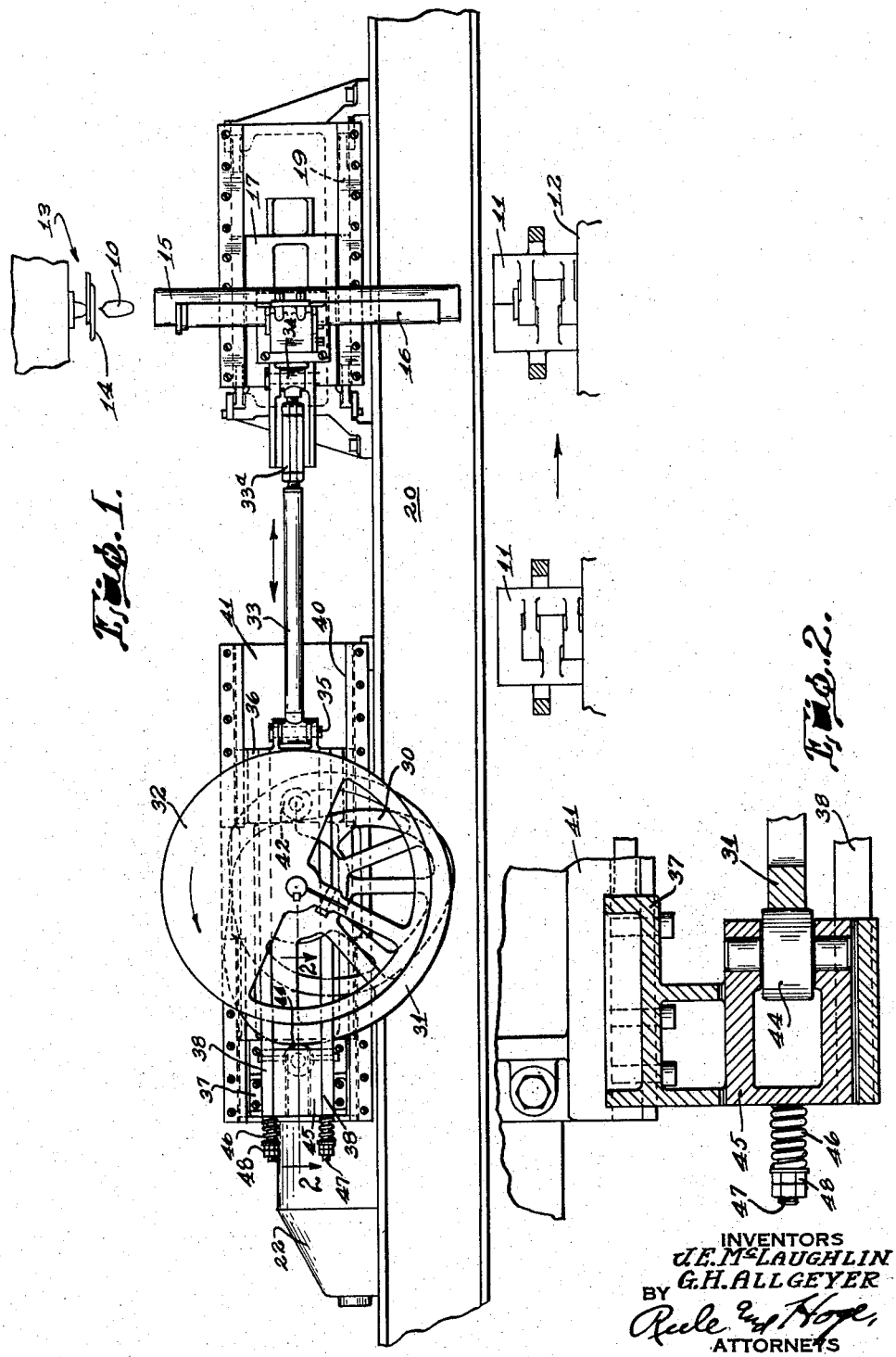

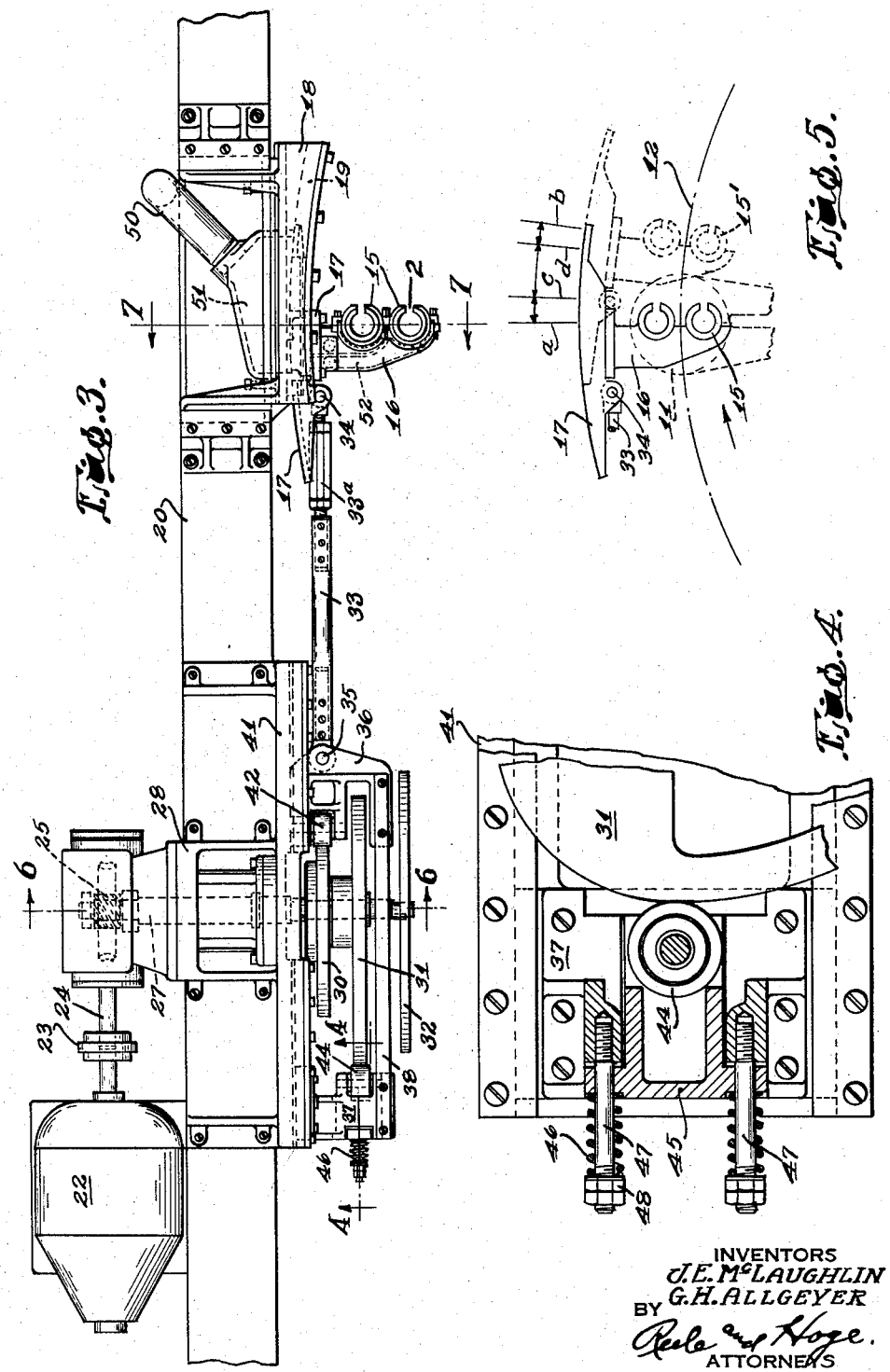

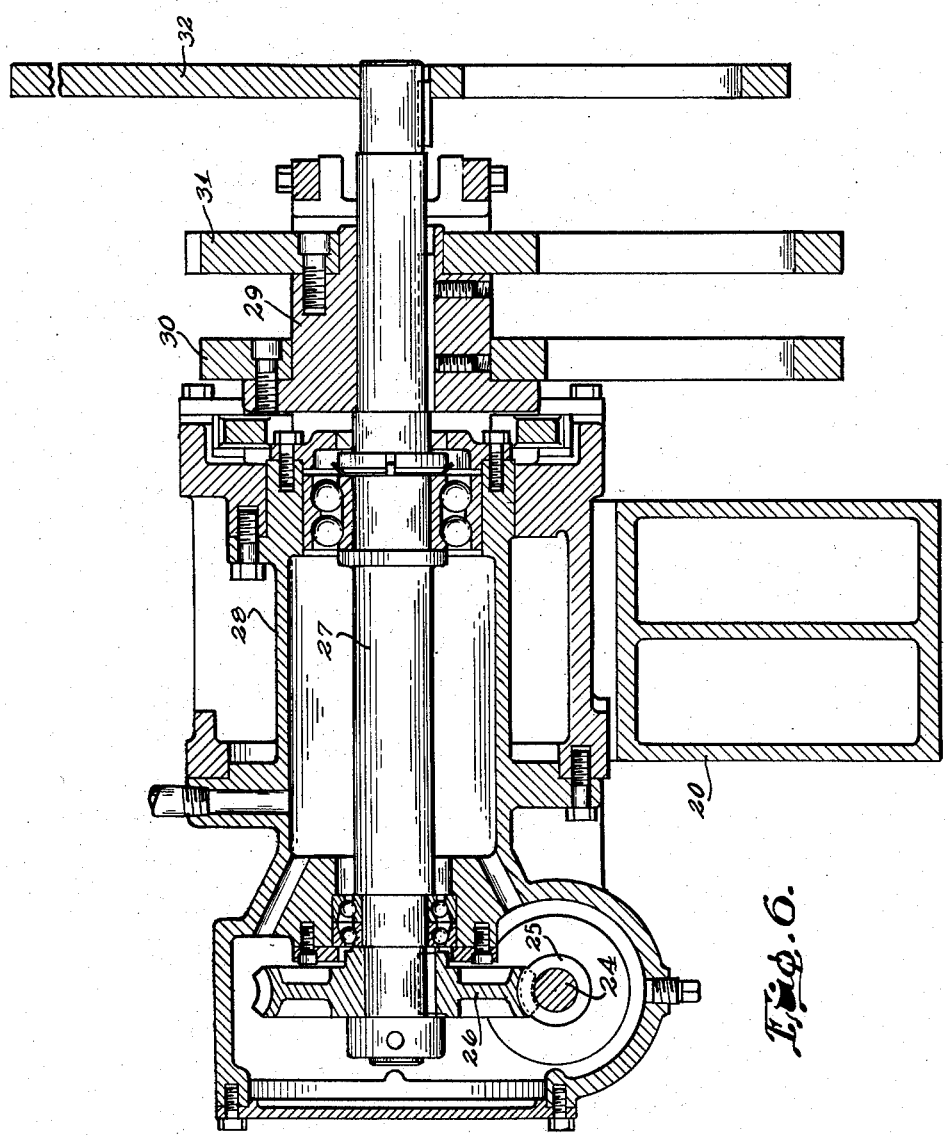

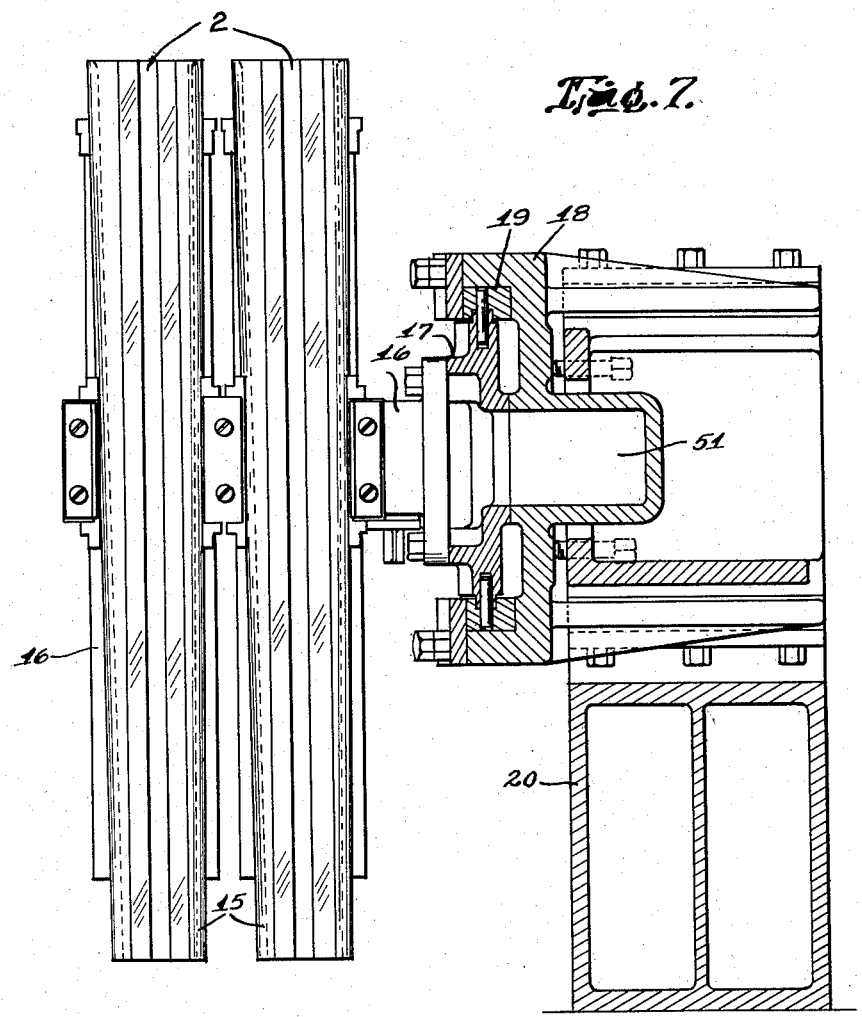

2,913,852

APPARATUS FOR GUIDING MOLD CHARGES OF GLASS INTO MOLDS

John E. McLaughlin, Alton, Ill., and Guy H. Allgeyer, Toledo, Ohio, assignors to Owens-Illinois Glass Company, a corporation of Ohio Application November 30, 1955, Serial No. 550,028

3 Claims. (Cl. 49—14)

Our invention relates to apparatus for use with machines for molding glass articles and particularly to means for guiding the gobs or charges of molten glass during their drop by gravity from a glass feeder to the traveling molds on a glass molding machine.

The apparatus is designed for use with molding machines of the type in which the mold carriage is continuously rotated about a vertical axis and brings the molds in rapid succession to a position to receive the charges or gobs of molten glass as they are delivered from the glass feeder and dropped by gravity into the molds. The mold charges or gobs as they are dropping from the feeder to the traveling molds therebeneath are given a forward movement by a horizontally reciprocating guide or guides, such movement being accelerated to give the mold charges the same forward speed as the molds and in the direction of mold travel as they enter the molds, the guides being then returned for cooperation with the next succeeding mold charges.

An object of the present invention is to provide novel means for reciprocating the guides and controlling their acceleration and deceleration. As the molds are brought in rapid succession to the charging position a correspondingly rapid reciprocation of the guides is required. In accordance with the present invention such reciprocation of the guides is effected and controlled by a conjugate cam mechanism including a cam for imparting the forward movement to the guide, the design and profile of the cam, which is rotated at a constant speed, permitting the acceleration, deceleration, and return of the guide with a minimum of shock and vibration to the mechanism as a whole. Positive drive connections are provided between the primary cam and the guides for accurately controlling their movement and acceleration while guiding the gobs to and into the molds.

A further feature of the invention relates to the use of a conjugate or complimentary cam construction in which a rigidly mounted or positively driven cam follower controls the forward movement of the guides while a secondary cam, connected to rotate with the primary cam, operates through a spring-loaded follower for retracting the gob guides. This construction permits the elimination of all backlash in the follower mechanism without requiring very close tolerances in the manufacturing of the parts. This novel construction also permits the cam follower rolls to run in one direction continuously. This eliminates follower roll reversal with its subsequent roll skidding, thereby eliminating the major cause of cam and roll wear.

Other objects of the invention and the precise nature thereof will appear more fully hereinafter.

Referring to the accompanying drawings which illustrate a preferred form of mechanism embodying our invention:

Fig. 1 is an elevational view of the mechanism;

Fig. 2 is a section at the line 2—2 on Fig. 1 showing a spring-loaded cam follower roll;

Fig. 3 is a plan view of the apparatus shown in Fig. 1;

Fig. 4 is a section at the line 4—4 on Fig. 3;

Fig. 5 is a diagrammatic view illustrating the oscillating movement of the gob guides;

Fig. 6 is a section at the line 6—6 on Fig. 3, on a comparatively large scale, showing the cams and driving means therefor; and Fig. 7 is a section at the line 7—7 on Fig. 3, showing the guides and their mounting.

Referring particularly to Figs. 1 and 5 the gob guiding apparatus is designed for guiding mold charges or gobs 10 of molten glass into the upwardly opening molds 11 therebeneath. The molds are mounted in an annular series on a mold carriage 12 which is rotated continuously about a vertical axis and carries the molds in succession through a charging zone which is in part directly beneath the gob feeder 13. The molds 11 are the plural cavity type, each having two mold cavities for simultaneously receiving two mold charges or gobs 10. The feeder 13 includes shears 14 of conventional design and operation for simultaneously shearing two gobs 10. The gobs as they drop by gravity are guided into the mold by a guiding device including guides in the form of vertical tubes 15 mounted on a carrier 16. The tubes are slotted longitudinally on their forward side, that is, the side facing the direction of travel during the charge guiding phase.

Referring to Figs. 1, 3, 5 and 7, the carrier 16 is attached to a slide 17 mounted for horizontal oscillating movement in arc-shaped guideways 19 formed in a frame 18. The guideways are preferably in an arc concentric with the axis of the mold carriage 12 and the perpendicular tubes 15 are arranged with their axes in a plane radial to the mold axis. The frame 18 is mounted on a horizontal stationary frame member 20 which provides a support for the guide operating mechanism.

Referring to Figs. 1 and 3, the mechanism for reciprocating the tube carrier 16 comprises a motor 22 which is an A.C. synchronous motor driven in synchronism with the rotation of the mold carriage. The motor is mounted on the frame 20. The motor shaft is connected by a coupling 23 to a worm shaft 24 with a worm 25 which drives a worm gear 26 (Fig. 6) keyed to a cam shaft 27. The cam shaft is journalled in a casing 28 mounted on the frame 20. A collar 29 keyed to the shaft 27 has mounted thereon cams 30 and 31, herein referred to respectively as primary and secondary cams. A balance wheel 32 is also keyed to the shaft 27.

As shown in Figs. 1 and 3, operating connections between the cams and the oscillating slide 17 include a connecting rod 33 which is adjustable in length as by means of a turnbuckle 33ª at one end of the rod. The rod is connected at its opposite end by a pivot 35 to a head 36 forming a part of a reciprocating unit including also a head 37. The heads 36 and 37 are rigidly connected together by bars 38. The heads 36 and 37 are mounted for reciprocation in guideways 40 formed in a stationary guide plate 41 mounted on the machine frame. A cam follower roll 42 journalled in the head 36 runs on the primary cam 30. A cam follower roll 44, shown in Figs. 1, 2, 3 and 4, is journalled in a carrier frame 45 and runs on the secondary cam 31. The frame 45 carrying the roll 44 is mounted for sliding movement in the head 37. The follower roll 44 is spring loaded by means of buffer springs 46 mounted on rods 47 having screw-threaded connection with the head 37. The springs 46 are held under compression between the frame 45 and adjustable nuts 48 on the rods. The frame 45 is slidable on the rods 47. The oscillating frame 17 carrying the guides 15 is positively driven in a forward direction by the cam 30 operating through the roll 42 and rod 33. The guides are returned by the secondary cam 31 operating through the buffer springs 46.

Referring to Fig. 3, the guides 15 are cooled and their temperature regulated by cooling air supplied through a conduit 50 to a chamber 51 in communication with an air channel 52 extending through the frame 16 to the guides 15.

The operation is as follows: The continuously running motor 22, synchronized with the motor which drives the mold carriage, rotates the cam shaft 27 through one complete rotation while the mold carriage 12 advances the angular distance between centers of each two adjacent molds 11. During this time interval the guides 15 are operated through one cycle which comprises advancing them from the full line position (Fig. 5) to the broken line position 15¹ and return. These positions are also indicated by the radial lines $a$, $b$.

The cams are designed to provide a dwell period during which the gob guides 15 are held stationary directly beneath the orifices of the gob feeding mechanism. While the parts are in this position the gobs are severed and when they have fallen far enough to be completely contained within the tubes 15, the cam 30 begins to move the guides forward, this movement being accelerated until the guides and the captive gobs have attained a horizontal forward speed equal to that of the mold therebeneath. At the instant this velocity is reached the gob guides are directly over and in alignment with the mold activities of the mold therebeneath. The position of the mold guides while in register with the gob feeder orifices is indicated by the line $a$ (Fig. 5). During the acceleration the guides are brought to position $c$. The guides then travel with the molds and at the same speed until position $d$ is reached during which time the gobs pass from the guides into the mold cavities. The cams then decelerate the guides which are brought to rest at position $b$. The guides are then returned, under the control of the auxiliary cam 31, and again positioned under and in register with the gob feeder, thus completing the cycle. The deceleration of the guides and their return travel is under the control of the secondary cam 31 operating through the spring buffers 46.

Modifications may be resorted to within the spirit and scope of our invention.

We claim:

1. In an apparatus for guiding mold charges of molten glass which are falling by gravity from a feeder to blank molds which are arranged in an annular series and are moving continuously in a horizontal path spaced beneath said feeder, said molds opening upwardly and being moved through a charging zone at least in part directly beneath the feeder, said apparatus including a straight vertical guide tube having open upper and lower ends, the improvement comprising mechanism including a continuously rotating primary cam shaped to hold the tube stationary in a starting position in register with the feeder outlet and upon the entry of a mold charge into the upper end of the tube to move the tube bodily in the direction of travel of a mold with the speed of the tube gradually accelerated from zero to the speed of travel of the mold and effect coaxial alignment of the tube and mold as the speed of the tube reaches that of the mold and substantially at the time the mold charge leaves the lower end of the tube and for maintaining said coaxial alignment for a predetermined period of time thereafter, means for holding the tube vertical throughout its said movement, said mechanism being operable to return the guide tube to its starting position, a rotatable secondary cam, said cam being mounted coaxially with said primary cam, a cam roller running upon the periphery of said primary cam, a head carrying said roller, means comprising a straight horizontal guideway in which said head is slideably mounted, means including an arcuate slide and guideway directly supporting the guide tube and connected to said head, said arcuate guideway and slide being formed concentric with the path of travel of the underlying blank molds, a cam roller riding upon the periphery of the secondary cam, and a yieldable mounting for said last-mentioned roller operatively connected to said head, said yieldable mounting operating to hold the first-named roller in rolling contact with the periphery of the primary cam.

2. In an apparatus for guiding falling gobs of molten glass, said means including a horizontally movable vertically disposed guide, the improvement comprising mechanism for oscillating said guide in a predetermined horizontal path comprising cams for moving the guide horizontally including a primary cam by which the guide is advanced to guide the gob during its downward movement, and a secondary cam by which the guide is retracted, means providing operating connections between the cams and said guide, a cam shaft on which the cams are coaxially mounted, the operating connections between the cams and guide including a reciprocating device, a connecting rod connecting said device with the guide, a cam follower roll journaled in said reciprocating device and running on said primary cam, said cam follower and primary cam cooperating during rotation of the shaft to provide advancing gob guiding movement to the guide from a starting position, a second cam follower roll running on said secondary cam, the latter-mentioned cam follower roll and secondary cam cooperating during rotation of the shaft to retract the guide to its starting position after its gob guiding movement is completed, and spring buffer means operatively connected to said reciprocating device and providing an operating connection between said second roll and the secondary cam.

3. In a gob guiding mechanism for charging molds carried on a mold carriage rotatable horizontally in a circular path, the improvement comprising a carrier on which an upright tubular guide is mounted, said guide and carrier being mounted for horizontal oscillation as a unit in an arc concentric with the path of rotation of the mold, the guide being slotted longitudinally substantially throughout its full length on its side adapted to face its direction of travel during gob guiding movement, means for guiding said unit in said arcuate path, a reciprocating device including a head mounted for horizontal reciprocation, a connecting rod connecting said head with said carrier, a cam shaft, a primary cam mounted for rotation with said shaft having a cam follower roll carried by said head and running on said primary cam, a secondary cam mounted for rotation with said shaft, a second head mounted for reciprocation toward and from the guide, a second cam follower roll carried by said second head and running on said secondary cam, means providing a spring buffer between said secondary roll and said second head, a synchronous electric drive motor adaptable for synchronism with the rotation of the mold carriage, and means connecting said motor to drive said cam shaft in synchronism with the mold carriage.

References Cited in the file of this patent

UNITED STATES PATENTS

| | | |
|---|---|---|
| 874,931 | Brenner | Dec. 31, 1907 |
| 1,331,536 | Soubier | Feb. 24, 1920 |
| 1,416,725 | La France | May 23, 1922 |
| 1,531,559 | Lynch | Mar. 31, 1925 |
| 1,531,560 | Lynch | Mar. 31, 1925 |
| 1,531,561 | Lynch | Mar. 31, 1925 |
| 1,823,062 | Pleukharp et al. | Sept. 15, 1931 |
| 2,316,408 | Dawson | Apr. 13, 1943 |
| 2,598,955 | Winder | June 3, 1952 |
| 2,665,525 | Younkers et al. | Jan. 12, 1954 |